Figure 1:
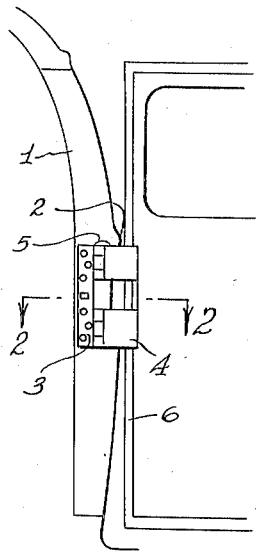

Jan. 14, 1941.  E. E. HOWE  2,228,876
HINGE
Filed April 2, 1938

INVENTOR.
EARL E. HOWE
BY
ATTORNEY

Patented Jan. 14, 1941

2,228,876

UNITED STATES PATENT OFFICE 2,228,876

HINGE

Earl E. Howe, Royal Oak, Mich.

Application April 2, 1938, Serial No. 200,907

7 Claims. (Cl. 16—135)

This invention relates to hinges and, specifically, to a concealed hinge particularly adapted for swingably supporting a door or panel from a curved body, as for example, an entrance door, deck door, or rumble seat panel of an automobile body. This application is a continuation in part of application Serial No. 185,035 which issued June 20, 1939, as Patent No. 2,163,323.

The principal objects of this invention are to provide a sturdy, reliable hinge of the concealed type, for the purposes described, which is susceptible to easy alinement for properly fitting a door to its frame, which will retain this proper fitting relation after prolonged use, which will withstand severe uses such as door slamming, closing of the door by pushing against one corner and undue weight as may be caused by a child riding thereon, and which is also economical to manufacture.

Numerous attempts have been and are being made by manufacturers of automotive equipment to supply a concealed hinge for automobiles. External hinges have always been unsightly and with the advent of curved body lines these hinges have to be made longer and hence increasingly objectionable. Not only is the trend toward "cleaner" body lines from the standpoint of appearance but also, these long exterior hinges often cause a sort of whistling noise at high running speeds and are the source of complaints on this account. Among the main difficulties encountered in numerous past attempts to provide concealed hinges is pin alinement. It will be understood that, even with the most modern production equipment, each door must be fitted in its frame and the opportunity of adjustment of the hinge parts must be provided. Ordinarily a slight bending of one hinge part with respect to the other of one or both hinges after the door is first hung will suffice and this is the preferred procedure, but this conventional manner of fitting has not been applicable to upper and lower concealed hinges since a bending of one hinge member usually results in misalinement of the pins and an unduly great consumption of time for realinement. Furthermore, these hinges are oftentimes not stable where there is very much body curvature because of the long length of hinge member necessary to bridge the space between the top or bottom of the door and the door frame when the door is open.

It is, therefore, an object of this invention to provide a hinge which will overcome these disadvantages and drawbacks and, more particularly, to provide a single hinge of the concealed type or placement near the center of the door post to which it is attached and which is so constructed that it will properly support the door with a minimum of hinge throw-out when open and which will close the door against its frame rather than against the door hinge member.

Figure 2:
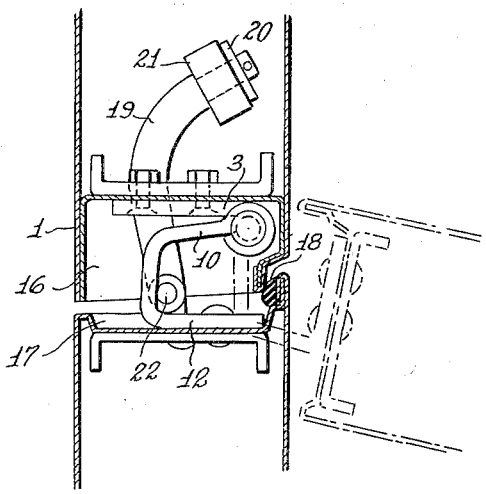
Figure 3:
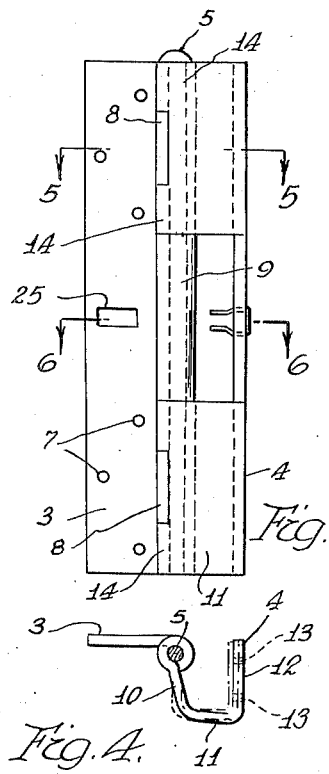
Figure 5:
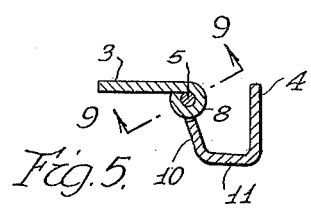
Figure 6:
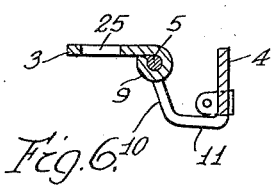
Figure 7:
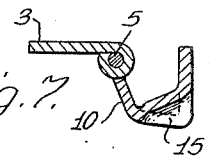
Figures 4, 8:
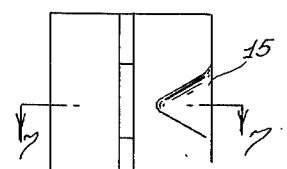
Figure 9:
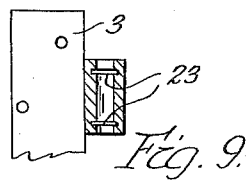
Figure 10:
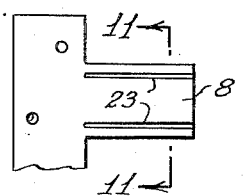
Figure 11:
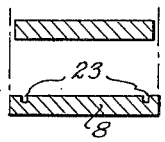

Other objects and advantages will become more fully apparent as reference is had to the accompanying drawing wherein my invention is illustrated, and in which Fig. 1 is a fragmentary view of a vehicle door frame having a door hung therein by my impoved hinge and swung to fully open position, Fig. 2 is an enlarged section taken along the line 2—2 of Fig. 1 showing the door in closed position and indicating its open position, Fig. 3 is an elevation of the hinge, Fig. 4 is an end view of the showing of Fig. 3, Figs. 5 and 6 are transverse sections taken along the lines 5—5 and 6—6 of Fig. 3, Figs. 7 and 8 are modifications of the ends of one of the hinge members showing stiffening means, Fig. 7 being a transverse section taken along the line 7—7 of Fig. 8, and Fig. 8 being an elevation, Fig. 9 is a vertical section taken along the line 9—9 of Fig. 5 showing the oil grooves, Fig. 10 is a fragmentary plan view of the hinge member of Figure 9 before the hinge receiving portion is rolled, and Fig. 11 is a double view showing a section taken along the line 11—11 of Fig. 10 as compared with a work piece prior to the formation of the oil grooves therein.

More particularly, 1 indicates a door supporting pillar, the view thereof being taken from within the door frame looking either forwardly or rearwardly of the vehicle, depending upon the choice of the manufacturer. The exterior of the pillar 1 is curved inwardly from its trim line 2 both at top and bottom as is conventional practice in modern automobiles. At or near, and preferably immediately below the trim line 2 a hinge member 3 is secured to the pillar 1 and to this member a second member 4 is pivotally attached by a hinge pin 5. A door 6, illustrated in open position, is secured to the member 4, the door being curved, of course, to conform to the shape of the vehicle body. This single hinge is the sole support of the door on the pillar 1.

The hinge is of the concealed type, which is to say that it is not visible either from the interior or from the exterior of the vehicle when the door is closed. In appearance, the hinge is somewhat larger than a conventional automobile door hinge and, in fact, may be said to resemble two joined alined hinges, at first glance. There are, however, very essential differences as will appear.

The member 3 is composed of a flat or plate-like main portion having a plurality of holes 7 therethrough for the reception of screws or other suitable attaching means. Along one edge thereof are widely separated cylindrical pintle receiving portions 8 and a relatively long cylindrical pintle receiver portion 9, all of which preferably are formed from the same piece of stock as the plate portion 3. The axes of the three cylinders 8 and 9 are alined.

The other main hinge member 4 is generally of U-shape in endwise view, the inside branches 10 thereof forming a greater angle with the base branch portions 11 than does the plate portion 12 and the several elements being flat rather than rounded. The plate portion 12 is approximately or exactly co-extensive in length with the plate 3 and has holes 13 to receive screws or similar means by which it is attached to the door 6. There are two coplanar spaced branches 11 and two coplanar spaced branches 10, the spacing in both cases being approximately equal to or slightly greater than the length of the cylindrical portion 9. Each branch 10 terminates in cylindrical pintle receiving portions 14 spaced a distance approximately equal to or slightly greater than the length of a cylindrical portion 8 for interfitting therewith.

In assembly, the cylindrical pintle receiving portions of both members 3 and 4 are alined to receive the single pintle 5.

When a door 6 is hung on a door pillar 1 by means of the hinge, afore described, it may be found that edges of the door form an angle with the corresponding sides of the door frame whereas they should be parallel therewith when the door is closed. This may ordinarily be remedied by tilting the axis of the pin 5 and this may be accomplished for instance by inserting a crow bar between the hinge branches and exerting a force manually thereon, and this may be done in such manner that the plate portions 3 and 12 will remain flat. The bend will occur in the branches 10 or 11 and it may be made to occur, for instance, in the branches 10 rather than in the branches 11 by stiffening the branches 11, for instance, by distorting them at 15, as illustrated in Figs. 7 and 8. The pintle receiving portion 9 becomes highly important in case of such an alining operation since it is this portion which maintains all cylindrical portions in alinement, thus preventing binding of the pintle. In other words, the structure as described permits a tilting of the pintle axis without binding the pintle and without disturbing the planar shape of the attaching plates.

The inside branches 10 were described as having greater angularity with respect to the base branch portions 11 than the plate 12. This angularity should be such that, even after binding of the branches 10 for door fitting purposes, the branches 10 will not contact the plate 3 when the door is closed, since the door and not the hinge should be subjected to the impact of door closing. This is illustrated in Fig. 2 in which it may be seen that the branches 10 forms a decided angle with the plate portion 3 and may be described as extending angularly across the recess 16 in the pillar 1, provided to receive the hinge. The door 6 is also recessed at 17, as illustrated, these two recesses forming a housing for the hinge when the door is closed. A seal 18 of some suitable material, such as rubber, may be provided on an inside wall of the recess 17 for contact with an outside countersunk edge of the recess 16, thus sealing the chamber 16, 17 against the entry of water.

If desired, a stop may be provided for residence vertically between the two branches 10. The stop comprises a curved, elongated arm 19, which projects through the plate 3 at 25 and through the base of the recess 16, and which has a flange or washer 20 at its outer end as a retainer for a resilient pad 21. The other end of the arm 19 is pivotally connected to a pin 22 anchored to the plate 12 as by a bracket provided for the purpose.

In order that the hinge may be better lubricated, I provide grooves 23 interiorly of some or all of the cylindrical portions in the manner illustrated in Figs. 9, 10 and 11. Before rolling these cylinders I prefer to press or roll the grooves into the hinge blanks. The original blank has a width illustrated in the upper portion of Fig. 11 which is widened by the operation of pressing the grooves 23 therein as indicated by the lower part of this figure. This increase must be taken into account in order that the hinge members will accurately interfit in assembly. These flat grooved portions as further illustrated in Fig. 10 are then rolled into cylinders as illustrated in Fig. 9.

What is claimed is:

1. A concealed hinge comprising two main members one of which is composed of a plate portion having an elongated pintle receiving portion integral with one edge thereof and relatively shorter pintle receiving portions one in spaced relation with each end of said elongated portion and coaxial therewith, and a second main member of U shape in end elevation having pintle receiving portions integral with one edge thereof, the last named portions fitting between said relatively shorter portions and said elongated portion, the base of the U and the branch of the U carrying the pintle receiving portions of said second main member being entirely omitted opposite said elongated portion, and a pintle extending through all of said portions connecting said members in hinged relation.

2. A concealed hinge comprising two main members, one of said members comprising an attaching plate having pintle receiving sockets along one edge thereof, the other of said members being of U shape in end elevation with one of the branches of the U comprising an attaching plate member and the other of said branches having pintle receiving sockets along the outer edge thereof, said other member being deformed at the juncture of the base of the U with the plate whereby said other branch will bend instead of said base and plate when subjected to distorting forces during door fitting, and a pintle extending through all of said sockets for connecting said members together.

3. A concealed hinge for vehicle doors comprising an attaching plate for mounting in a door recess, interspaced branches extending from the said plate at substantially right angles therefrom, branches extending at greater than a right angle from the first named branches, forming a generally U shaped hinge member, and an attaching plate for mounting in a body recess parallel to the first named plate when the door is in its closed position, having a pintle receiving portion extending between the spacing of said branches, interfitted pintle receiving portions on the last named branches and said last named plate, and a single hinge pin passing through all of the pintle receiving portions.

4. A concealed hinge comprising two main members, one of said main members having pintle receiving means adjacent each end thereof, said one main member being of such length as compared to the length of said pintle receiving means to provide a wide separation of said pintle receiving means, the second main member having substantially U-shaped arms thereon as viewed in end elevation spaced like said pintle receiving means, two of the arms of said U being integrally connected and the two remaining arms having pintle receiving means interfitting with respective first named pintle receiving means, a pintle extending through all of said pintle receiving means, and means on said first named plate reinforcing the portion of said pintle extending between the spaced pintle receiving means against bending in the presence of extrinsic forces tending to bend the arm portions for adjustment purposes.

5. A concealed hinge comprising two main plates, one of said plates having integral pintle receiving loops at opposite ends thereof and being of such length as compared to the length of the loops to provide a wide separation of the loops, the second plate having integral arms extending outwardly and angularly therefrom in spaced relation like said loops and terminating in pintle receiving loops, said second named loops interfitting with the first named loops, a pintle extending through all of said loops, and a loop formation on the first plate encircling the portion of the pintle between the spaced loops and reinforcing said portion against bending in the presence of extrinsic forces tending to bend the arm portions for adjustment purposes.

6. A concealed hinge comprising two main plates, one of said plates having integral pintle receiving loops at opposite ends thereof and being of such length as compared to the length of the loops to provide a wide separation of the loops, the second plate having integral arms extending outwardly and angularly therefrom in spaced relation like said loops and terminating in pintle receiving loops, said second named loops interfitting with the first named loops, said arms being composed of first portions which extend substantially perpendicular to their plate and second portions extending at an oblique angle from the first portions of the loops thereon, a pintle extending through all of said loops, and means reinforcing said arms at their meeting angles with the plate to prevent distortion thereof in the presence of extrinsic forces tending to bend said arms for adjustment purposes.

7. A concealed hinge comprising two main plates, one of said plates having integral pintle receiving loops at opposite ends thereof and being of such length as compared to the length of the loops to provide a wide separation of the loops, the second plate having integral arms extending outwardly and angularly therefrom in spaced relation like said loops and terminating in pintle receiving loops, said second named loops interfitting with the first named loops, said arms being composed of first portions which extend substantially perpendicular to their plate and second portions extending at an oblique angle from the first portions of the loops thereon, a pintle extending through all of said loops, means reinforcing said arms at their meeting angles with the plate to prevent distortion thereof in the presence of extrinsic forces tending to bend said arms for adjustment purposes, and a loop formation on said first named plate encircling the portion of the pintle between the spaced loops and reinforcing said portion against bending in the presence of said extrinsic bending forces.

EARL E. HOWE.